US010217017B2

(12) United States Patent
Najafirad et al.

(10) Patent No.: US 10,217,017 B2
(45) Date of Patent: Feb. 26, 2019

(54) SYSTEMS AND METHODS FOR CONTAINERIZING MULTILAYER IMAGE SEGMENTATION

(71) Applicants: Peyman Najafirad, San Antonio, TX (US); Mohan Muppidi, San Antonio, TX (US); Sos Agaian, San Antonio, TX (US); Mo Jamshidi, San Antonio, TX (US)

(72) Inventors: Peyman Najafirad, San Antonio, TX (US); Mohan Muppidi, San Antonio, TX (US); Sos Agaian, San Antonio, TX (US); Mo Jamshidi, San Antonio, TX (US)

(73) Assignee: Board of Regents, The University of Texas System, Austin, TX (US)

(*) Notice: Subject to any disclaimer, the term of this patent is extended or adjusted under 35 U.S.C. 154(b) by 73 days.

(21) Appl. No.: 15/268,827

(22) Filed: Sep. 19, 2016

(65) Prior Publication Data
US 2017/0084040 A1 Mar. 23, 2017

Related U.S. Application Data

(60) Provisional application No. 62/220,111, filed on Sep. 17, 2015.

(51) Int. Cl.
*G06K 9/00* (2006.01)
*G06K 9/38* (2006.01)

(52) U.S. Cl.
CPC ........................... *G06K 9/38* (2013.01)

(58) Field of Classification Search
CPC .. G06K 9/00–9/82; G06T 67/00–67/97; G06T 3/00–3/608; G06T 7/00–7/97
See application file for complete search history.

(56) References Cited

U.S. PATENT DOCUMENTS

| 5,201,012 | A  | * | 4/1993 | Hisano     | G06K 9/38  |
|           |    |   |        |            | 358/466    |
| 6,721,453 | B1 | * | 4/2004 | Benson     | G05D 1/0221 |
|           |    |   |        |            | 382/199    |
| 7,003,366 | B1 | * | 2/2006 | Chiou      | G06N 5/045 |
|           |    |   |        |            | 700/108    |
| 7,496,237 | B1 | * | 2/2009 | Dominguez  | G06K 9/38  |
|           |    |   |        |            | 382/237    |

(Continued)

OTHER PUBLICATIONS

Image segmentation by three-level thresholding based on maximum fuzzy entropy and genetic algorithm Wen-Bing Tao , Jin-Wen Tian, Jian Liu Pattern Recognition Letters 24 (2003) 3069-3078.*

(Continued)

*Primary Examiner* — Sean T Motsinger
(74) *Attorney, Agent, or Firm* — Thomas | Horstemeyer, LLP

(57) ABSTRACT

The present disclosure relates to a cascade thresholding system to find an optimal threshold for binarization of a gray scale image. The cascade system can perform different levels of quantization on an input image. The cascade system can process each quantized image across multiple threshold levels. SSIM scores can be calculated for the quantized images to determine a best image for binarization. A best binary image can be generated.

20 Claims, 17 Drawing Sheets
(4 of 17 Drawing Sheet(s) Filed in Color)

(56) References Cited

U.S. PATENT DOCUMENTS

| | | | | |
|---|---|---|---|---|
| 8,311,973 B1* | 11/2012 | Zadeh | ...................... | G06N 7/02 |
| | | | | 706/62 |
| 2005/0021212 A1* | 1/2005 | Gayme | .................. | G06N 5/048 |
| | | | | 701/99 |
| 2006/0269111 A1* | 11/2006 | Stoecker | ............... | G06F 19/321 |
| | | | | 382/128 |
| 2008/0083029 A1* | 4/2008 | Yeh | ...................... | H04L 63/1425 |
| | | | | 726/22 |
| 2009/0055097 A1* | 2/2009 | Kowalik | ............. | E21B 47/0002 |
| | | | | 702/6 |
| 2010/0185336 A1* | 7/2010 | Rovnyak | ................... | H02J 3/38 |
| | | | | 700/287 |
| 2010/0218133 A1* | 8/2010 | Dillen | ............... | G06F 17/30743 |
| | | | | 715/771 |
| 2012/0087565 A1* | 4/2012 | Garud | ...................... | G06T 5/002 |
| | | | | 382/132 |
| 2012/0281908 A1* | 11/2012 | Shirkhodaie | ............ | G06T 7/001 |
| | | | | 382/159 |
| 2015/0213621 A1* | 7/2015 | Buemi | .................... | G06T 7/408 |
| | | | | 382/165 |
| 2015/0371084 A1* | 12/2015 | Huang | ...................... | G06T 7/11 |
| | | | | 382/192 |
| 2017/0084040 A1* | 3/2017 | Rad | .......................... | G06K 9/38 |

OTHER PUBLICATIONS

A Technique of Three-Level Thresholding Based on Probability Partition and Fuzzy 3-Partition Mansuo Zhao, Alan M. N. Fu, and Hong Yan, IEEE Transactions on Fuzzy Systems, vol. 9, No. 3, Jun. 2001.*

Muppii, Mohan, et al. "Image segmentation by multi-level thresholding based on fuzzy entropy and genetic algorithm in cloud." System of Systems Engineering Conference (SoSE), 2015 10th. IEEE, 2015.

Muppii, Mohan, et al. "Image segmentation by multi-level thresholding using genetic algorithm with fuzzy entropy cost functions." Image Processing Theory, Tools and Applications (IPTA), 2015 International Conference on. IEEE, 2015.

Muppii, Mohan, et al. "Container based parallelization for faster and reliable image segmentation." Imaging Systems and Techniques (IST), 2015 IEEE International Conference on. IEEE, 2015.

* cited by examiner

| | | |
|---|---|---|
| Algorithm | Pseudo code for Quantization using Genetic Algorithm and Fuzzy Entropy | |
| 1: | Input | Image |
| 2: | Initialize | Population, |
| 3: | | Best Entropy |
| 4: | For Count ← 1 to Number of iterations for GA | |
| 5: | Set | Test Population with random candidate solutions |
| 6: | Sort | Test Population in ascending order |
| 7: | Calculate | Membership Functions, |
| 8: | | Fuzzy entropy of image for each membership function, |
| 9: | | Total fuzzy entropy of image |
| 10: | If | Total fuzzy entropy > Best Entropy  Then |
| 11: | Set | Best Entropy as total fuzzy entropy, |
| 12: | | Population as Test Population |
| 13: | End | |
| 14: | Initialize | Thresholds |
| 15: | Calculate | Thresholds using Population |
| 16: | Quantize | The Image using Thresholds |
| 17: | Calculate | SSIM |
| 18: | Return | Quantized Image |
| 19: | | SSIM |

SYSTEMS AND METHODS FOR CONTAINERIZING MULTILAYER IMAGE SEGMENTATION

CROSS-REFERENCE TO RELATED APPLICATION

This application claims priority to U.S. Provisional Application Ser. No. 62/220,111 filed Sep. 17, 2015, which is hereby incorporated by reference herein in its entirety.

BACKGROUND

Object detection in an image is an important research area. With the increased use of mobile devices and cloud services, the demand for image based search engines and textual reorganization has escalated. In object recognition and textual recognition, object and text detection is one of the steps. Binarization of an image can be used for detection purposes.

DESCRIPTION OF THE DRAWINGS

This patent or application file contains at least one drawing executed in color. Copies of the patent or patent application publication with color drawing(s) will be provided by the Office upon request and payment of the necessary fee.

FIG. 6 is an example of pseudo code for quantization using a genetic algorithm and fuzzy entropy according to various embodiments of the present disclosure.

DETAILED DESCRIPTION

The present disclosure relates to a cascade thresholding system to find an optimal threshold for binarization of a gray scale image. The present disclosure also provides thresholding techniques using fuzzy logic. The thresholding techniques described in this disclosure can use fuzzy entropy and genetic algorithms to determine the thresholds. According to one embodiment, the cascade system includes two sub-systems. A first sub-system can apply different levels of quantization on an input image. The first sub-system can also output a quantized images based at least in part on the input image. A second sub-system can apply two-level quantization on the quantized images output by the first sub-system. The second sub-system can determine a preferred two-level quantized image using a non-reference edge map measure to find an optimal threshold for binarization. According to another embodiment, the system second sub-system can apply an arithmetic algorithm to the quantized images output by the first sub-system to generate a compressed quantized image.

Figure 1:
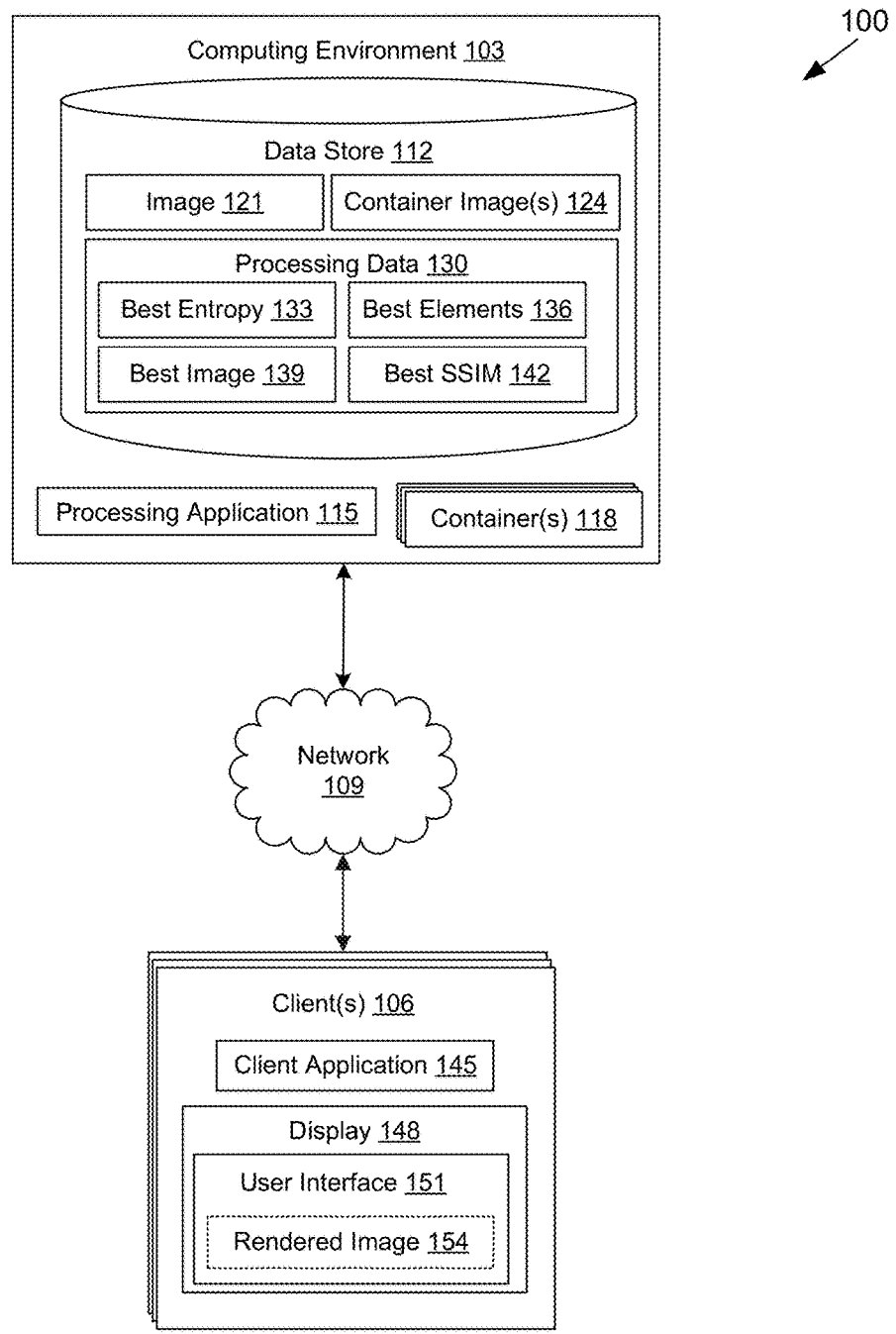
FIG. 1 is a drawing of a networked environment according to various embodiments of the present disclosure.

With reference to FIG. 1, shown is a networked environment 100 according to various embodiments of the present disclosure. With reference to FIG. 1, shown is a networked environment 100 according to various embodiments. The networked environment 100 includes a computing environment 103, a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 can include, for example, a server computer or any other system providing computing capability. Alternatively, the computing environment 103 can employ a plurality of computing devices that can be arranged, for example, in one or more server banks or computer banks or other arrangements. Such computing devices can be located in a single installation or can be distributed among many different geographical locations. For example, the computing environment 103 can include a plurality of computing devices that together may comprise a hosted computing resource, a grid computing resource and/or any other distributed computing arrangement. In some cases, the computing environment 103 can correspond to an elastic computing resource where the allotted capacity of processing, network, storage, or other computing-related resources may vary over time.

Various applications and/or other functionality can be executed in the computing environment 103 according to various embodiments. Also, various data is stored in a data store 112 that is accessible to the computing environment 103. The data store 112 can be representative of a plurality of data stores 112 as can be appreciated. The data stored in the data store 112, for example, is associated with the operation of the various applications and/or functional entities described below.

The components executed on the computing environment 103, for example, include a processing application 115, one or more containers 118, and other applications, services, processes, systems, engines, or functionality not discussed in detail herein. The processing application 115 is executed to quantize an image using a genetic algorithm with fuzzy entropy as a cost function and binarizing the best quantized image.

The data stored in the data store 112 includes, for example, one or more images 121, one or more container images 124, processing data 130, and potentially other data. The processing data can include a best entropy 133, a best element 136, a best image 139, and a best structural similarity index (SSIM) 142. The images 121 can be received from various client devices 106 for processing. The images 121 can include photographs, drawings, bitmaps, compressed images, and other images. The images 121 can be stored in various formats, such as JPEG, GIF, BMP, PNG, TIF, and other formats. The container images 124 can include code and configuration information that can be executed as a container 118.

The processing data 130 can be stored by the processing application 115 during processing of images. In some embodiments, processing data 130 includes multiple sets of data for multiple images 121 being processed. The processing data 130 can include processing data from previously processed images 121. The processing data 130 can have a set of data for each container 118 currently running and can have multiple sets of data for each container 118.

The best entropy 133 can be a numeric value representing a highest calculated entropy corresponding to a set of membership functions, where the elements from the set of membership functions can be stored in the best elements 136. The best elements 136 can be stored as a collection of integers. As an example, the best elements 136 can be stored as $a_1, a_2, \ldots a_n$. Similar to the best entropy 133, the best SSIM 142 can be a value corresponding to the highest SSIM value calculated for a quantized image. The quantized image corresponding to the best SSIM 142 can be stored in best image 139.

The client device 106 is representative of a plurality of client devices that may be coupled to the network 109. The client device 106 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a client application 145 and a display 148 with a user interface 151. The user interface 151 may include a rendered image 154. The display 148 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 can be configured to execute various applications such as a client application 145 and/or other applications. The client application 145 can be executed in a client device 106, for example, to access network content, such as an image 121, a quantized image, or a binarized image, served up by the computing environment 103 and/or other servers, thereby rendering the user interface 151 on the display 148. To this end, the client application 145 can include, for example, a browser, a dedicated application, etc., and the user interface 151 may comprise a network page, an application screen, etc. The client device 106 can be configured to execute applications beyond the client application 145 such as, for example, email applications, social networking applications, word processors, spreadsheets, and/or other applications.

The client application 145 can submit images for processing to the processing application 115. In one embodiment, the client application 145 can request an image from the computing environment 103, and the processing application 115 can process the image 121 before sending the image to the client application 145. For example, the client application 145 may request all images 121 containing the face of a specific user. The processing application 115 can quantize and/or binarize multiple images 121 and perform facial recognition on the resulting images to identify the specific user. The images 121 that contain a face of the specific user can be sent to the client device 106.

Next, a general description of the operation of the various components of the networked environment 100 is provided. A VM based virtual infrastructure can be used in a cloud computing environment for elastic resource provisioning. Performing resource management using VMs, however, can require more resources than container images 124. The container images 124, such as those prepared via the Docker, or Rocket projects, can be a unit of deployment for cloud-native application architectures, such as in networked environment 100. The containers 118 can leverage modern operating system primitives such as control groups (cgroups) and namespaces to provide resource allocation and isolation features, such as those provided by virtual machines, with much less overhead and much greater portability.

A container 118 can be used to perform parallel image quantization. The architecture of the container 118 can be based parallel image quantization. The computing environment 103 can include the following architectural components: Host Node, containers 118, Initializer program, and finisher program.

The host node can be a hardware machine on which the containers 118 would be running as applications on the top of its operating system. The containers 118 can utilize a host node operating system kernel to run as isolated applications.

The containers 118 can share a single operating system and therefore can use the same binaries and libraries, such as container images 124. The containers 118 can facilitate the usage of modular application designs, where the data store 112 can be independent and provide for applications to be scaled without also scaling the number of machines in the computing environment 103. The containers 118 can be instances in which the specified code or program would be running on, such as a container image 124.

The container 118 can perform one or more steps of the quantization process 1400, binarization process 1500, and/or containerized process 1600. For example, a container 118 can calculate an SSIM score for an image. The container 118 can output the image and SSIM and then die. In some embodiments, a container 118 can find a best quantized image for a given membership formula at one threshold, and calculate an SSIM score for that threshold and formula. The processing application 115 can utilize several containers 118 to find the SSIM score at different threshold levels for one or more formulas.

The processing application 115 can determine a best image 139 based on the returned SSIM scores from the various containers 118. As an example, the processing application 115 can find a best SSIM 142 and best image 139 from multiple levels of thresholding for three different formulas, such as a bell shaped, triangular, and trapezoidal formulas using multiple threshold levels with each formula. In this example, the processing application 115 can determine a best overall image for binarization by comparing the best image 139 from each formula.

The processing application 115 can include an initializer program that starts the container 118 once the image 121 is received. The processing application 115 can listen for incoming image message from a client device 106. In one embodiment, once an image 121 has arrived, the processing application 115 can start four containers 118 for four different quantization techniques, and pass the image 121 to the containers 118 for processing.

The processing application 115 can include a finisher program that runs after the initializer program. The finisher program can collect the SSIM values from the four containers 118 once the containers 118 have finished processing the image 121. The processing application 115 can then find the quantized image with the best SSIM score, and store the quantized image as the best image 139 based on the quantized image having the best SSIM 142.

With reference to FIGS. 2-5, shown are various examples of shapes of membership functions as applied to a quantized image by processing application 115 according to various embodiments. The processing application 115 can quantize the image 121 at each of one or more levels. According to one embodiment, the image 121 is quantized to generate a quantized image at a first level and then a second level. In another embodiment, the image 121 is quantized for all levels between 1 and 255 to generate multiple quantized images. The processing application 115 can quantize the images by reducing the number of grey scales or colors available to represent each pixel of an image using a lossy compression algorithm. The quantization algorithm can be the algorithm discussed herein in FIG. 14 and used in combination with the algorithms in FIGS. 15 and 16.

The quantization algorithm can use any of the membership functions discussed herein. For example, each of the images 121 can be quantized by an algorithm as described in FIG. 14, such as a triangular membership function, a trapezoidal membership function, a bell shaped membership function, and other membership functions. The processing application 115 can generate a binarized image using binarization. As an example, the processing application 115 can reconstruct the image from a gray scale edge map to get a binary image, as discussed in FIG. 15.

A processing application 115 can generate an SSIM score for each of the resulting images from the algorithm from FIG. 1. The processing application 115 can determine a best score from generated SSIM scores. The processing application 115 can select the best scoring image for further processing. For example, the processing application 115 can recognize text within a best scoring image. As another example, the processing application 115 can detect objects within the best scoring image.

Segmentation can be a fundamental task in image analysis and understanding. The goal of image segmentation can be to partition an image into a set of separate regions that have similar characteristics such as intensity, color and texture. Image segmentation can also play a key role in many image and video processing applications such as medical imaging, satellite imaging, computer vision, identify anatomical structures, object and facial recognition, agricultural imaging, robotics features extraction for mobile robot localization and detection and map procession for lines and legends finding, and others. For example, in medical image segmentation different image components can be used for the analysis of different structures, tissues and pathological regions.

In one embodiment, an image can be segmented to detect a brain tumor. Manual segmentation can be a challenging and time consuming task that requires a considerable amount of expertise. In addition, automated analysis of medical images may require partitioning data into meaningful regions or segments. Partitioning the data can enable automation of the process and make the diagnosis of several medical conditions faster and easier.

In robotic applications where time is an important factor, processing or analyzing fewer segments in of an image can save both time and computation power. The thresholding methods can be used to segment an image. When distinct objects are depicted within a given scene, multiple threshold values called t1; t2; . . . ; ti with i>2 can be determined. Soft computing techniques like Fuzzy logic, evolutionary computation, artificial neural networks, and robotics support vector machines can be used in image segmentation as an alternative to other computation methods.

A soft computing algorithm can be used as an unsupervised clustering method. But soft computing algorithms can be sensitive to noise and imaging artifacts. The soft computing can be made more robust by using a new fuzzy entropy based criteria (cost function) with a genetic algorithm. An optimized set of parameters can be found for a predefined cost function. The optimum set of membership functions can be found by maximizing the fuzzy entropy. The optimum set of membership functions can be used to process the image by partitioning the image into a set of separate regions that have similar characteristics.

Figure 2:
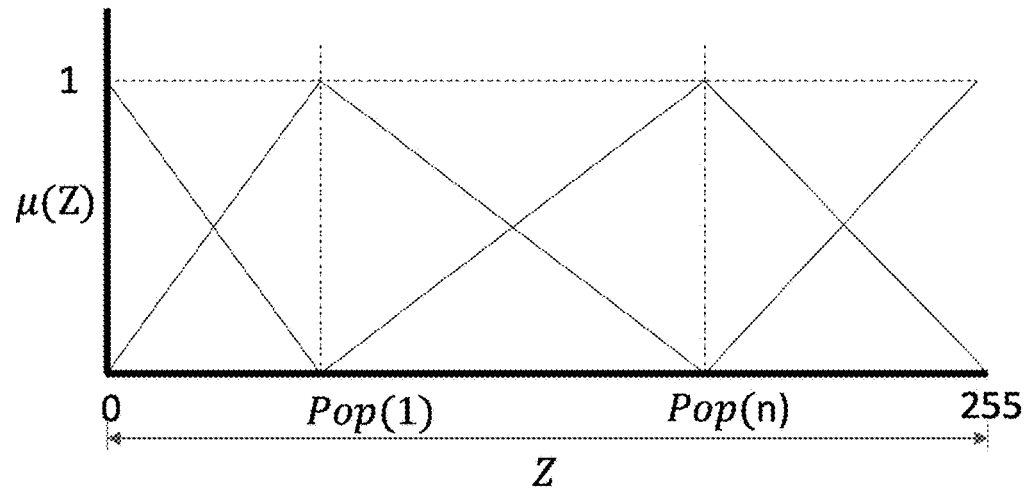
FIG. 2 is a graph illustrating a set of triangular membership functions according to various embodiments of the present disclosure.
Figure 3:
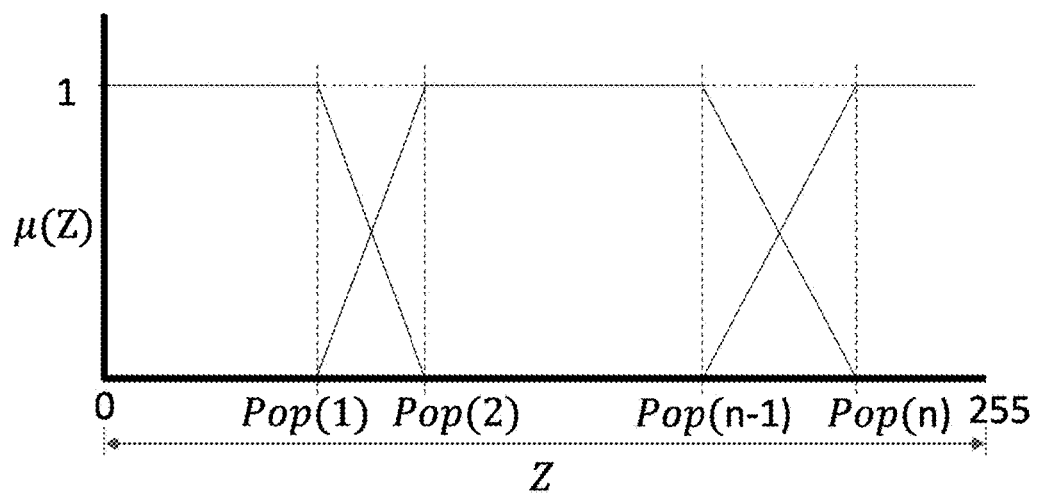
FIG. 3 is a graph illustrating a set of trapezoidal membership functions according to various embodiments of the present disclosure.
Figure 4:
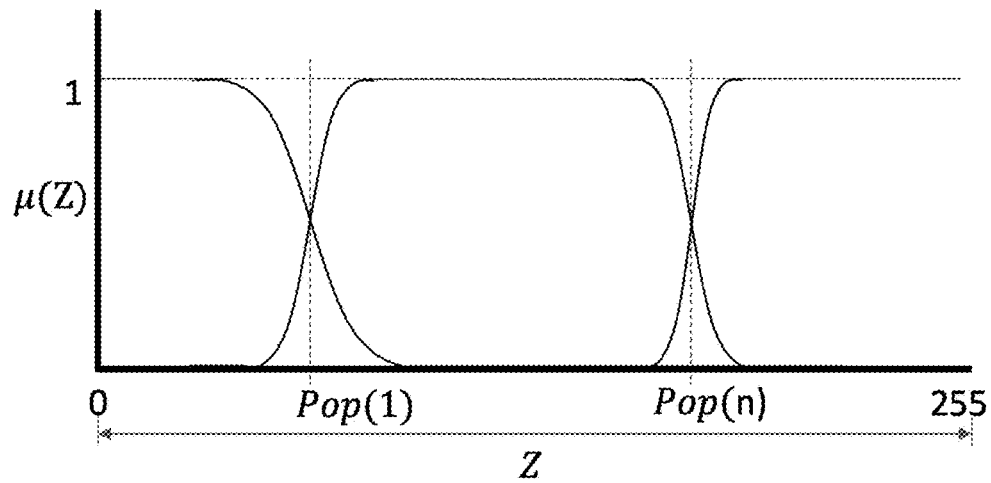
FIG. 4 is a graph illustrating a set of bell shaped membership functions according to various embodiments of the present disclosure.
Figure 5:
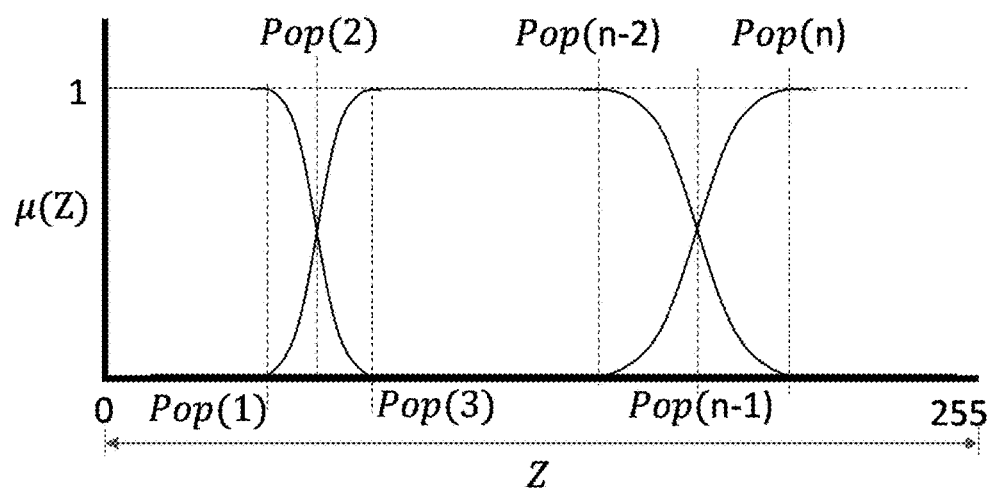
FIG. 5 is a graph illustrating a set of membership functions according to various embodiments of the present disclosure.

FIG. 2 shows the shape of one example of triangular membership function for calculating the fuzzy entropy as applied to an image. The image can be quantized in each of one or more levels. FIG. 3 shows the shape of an example of trapezoidal membership function for calculating the fuzzy entropy as applied to the image. FIG. 4 shows the shape of an example of bell shaped membership function for calculating the fuzzy entropy as applied to the image. FIG. 5 shows the shape of an example of another membership function for calculating the fuzzy entropy as applied to the image.

A image can have a probability partition. In an equation where I can represent an image with dimensions N and M, where I(x,y) is a grey level pixel value at pixel location (x,y):

$$D_k = \{(x,y): I(x,y) = k, (x,y) \in D\}$$

Where k is 256 gray levels of the image that is, k=0, 1, 2 . . . 255.

$$h_k = \frac{m_k}{N * M}$$

$m_k$ is number of elements in $D_k$. $\Pi_{256}=\{D_0, D_1, \ldots D_{255}\}$ is the probability partition of D with a probability distribution.

$$P_k = P(D_k) = h_k, k=0,1 \ldots 255$$

If n−1 thresholds segment an image to have n segments, from the above definitions we can have $\in_n = \{D_0, D_1, \ldots D_{n-1}\}$ which is a probability partition of D with a probability distribution of:

$$p_d = P(D_d), d=0,1 \ldots n-1$$

Where n<255 is the number of gray levels in segmented image.

Fuzzy entropy can be determined from the probability distribution. The probability distribution is as follows:

$$p_d = \sum_{k=0}^{255} p_k * \mu_d(k)$$

Where $\mu_d$ is the membership function of a level in n levels. The fuzzy entropy can be calculated as follows:

$$H_d = -\sum_{k=0}^{255} \frac{p_k * \mu_d(k)}{p_d} \ln\left(\frac{p_k * \mu_d(k)}{p_d}\right)$$

And total fuzzy entropy is given by $$H = \sum_{d=0}^{n-1} H_d$$

For n level thresholding, n−1 membership functions can be used. In one embodiment, each membership function can include four variables chosen to control the shape of the set of membership functions. P can be a set of all the parameters which determine the shape of membership function.

Various membership functions can be used to quantize an image. As an example, a set of triangular membership functions in FIG. 2 can be represented as follows:

$$\mu_d = Z_d(k, a_1, a_2, a_3)$$
$$P = \{0, a_1, a_2, \ldots a_n, 255\}$$
$$0 < a_1 \leq a_2 \ldots a_n < 255$$
$$k = 0, 1, 2 \ldots n-1$$

$$\mu_0(k) = \begin{cases} 0 & 0 \geq k \\ \frac{a_1 - k}{a_1} & 0 < k \leq a_1 \\ 0 & k < a_1 \end{cases}$$

$$\mu_q(k) = \begin{cases} 0 & k \leq a_q \\ \frac{k - a_q}{(a_{q+1} - a_q)} & a_q \leq k \leq a_{q+1} \\ \frac{\alpha_{q+2}}{(a_{q+2} - a_{q+1})} & a_{q+1} \leq k \leq a_{q+2} \\ 0 & k > a_{q+2} \end{cases}$$

$$\mu_{n-1}(k) = \begin{cases} 0 & k \leq a_{n-1} \\ \frac{k - a_{n-1}}{255 - a_{n-1}} & a_{n-1} < k \leq 255 \\ 0 & k > 255 \end{cases}$$

The set of variables obtained by optimizing the fitness function are elements of P. These elements can be used to find the thresholds for segmenting the image using the following equation.

$$\text{Threshold } t_i = \frac{P[i] + P[i+1]}{2}$$

Where i=0, 1, 2 . . . len(P)−1

As another example, a set of trapezoidal membership functions can be used. Similar to the set of triangular membership functions, a set of trapezoidal membership functions can be mathematically modeled to depend on a set of variables $a_1, a_2, \ldots a_{2(n-1)}$ where n represents number of membership functions in the set. These variables can be used as feed for the genetic algorithm to maximize the fitness function, which is fuzzy entropy. In the below example, the set of all the variables along with 0 and 255 is represented by P. For n level thresholding, 2n membership functions can be used. $\mu$ represents the membership function. The trapezoidal membership functions can be represented as follows:

$$\mu_d = Z_d(k, a_1, a_2, a_3, a_4)$$
$$P = \{0, a_1, a_2, \ldots a_n, 255\}$$
$$0 < a_1 \leq a_2 \ldots a_n < 255$$
$$k = 0, 1, 2 \ldots n-1$$

$$\mu_0(k) = \begin{cases} 0 & 0 \geq k \\ 1 & 0 < k \leq a_1 \\ \frac{a_2 - k}{(a_2 - a_1)} & a_1 < k \leq a_2 \\ 0 & k < a_1 \end{cases}$$

$$\mu_q(k) = \begin{cases} 0 & k \leq a_1 \\ \frac{k - a_1}{(a_2 - a_1)} & a_1 \leq k \leq a_2 \\ 1 & a_2 \leq k \leq a_3 \\ \frac{\alpha_4 - k}{(a_4 - a_3)} & a_3 \leq k \leq a_4 \\ 0 & k > a_4 \end{cases}$$

$$\mu_{n-1}(k) = \begin{cases} 0 & k \leq a_{n-2} \\ \frac{k - a_{n-2}}{a_{n-1} - a_{n-2}} & a_{n-2} < k \leq a_{n-1} \\ 1 & a_{n-1} < k \leq 255 \\ 0 & k > 255 \end{cases}$$

The thresholds can be calculated as:

$$\text{Threshold } t_i = \frac{P[2i] + P[2i+1]}{2}$$

Where k=0, 1, 2 . . . len(P)/2.

As yet another example, a set of bell shaped membership functions can be represented as:

$$\mu_d = Z_d(k, a_1, a_2, a_3, a_4)$$

$$P = \{0, a_1, a_2, \ldots a_n, 255\}$$

$$0 < a_1 \le a_2 \ldots a_n < 255$$

$$k = 0, 1, 2 \ldots n - 1$$

$$\mu_0(k) = \frac{1}{1 + \left|\frac{k}{a_1}\right|^{2b}}$$

$$\mu_q(k) = \frac{1}{1 + \left|\frac{2(k - a_1)}{a_2 - a_1}\right|^{2b}}$$

$$\mu_{n-1}(k) = \frac{1}{1 + \left|\frac{(k - 255)}{255 - a_2}\right|^{2b}}$$

Thresholds are given by $a_1, a_2, \ldots a_n$

Turning to FIG. 6, shown is an example pseudo code representing a portion of processing application 115 (FIG. 10) for a quantization technique according to various example embodiments. The containers can use one of the techniques and execute the technique to provide a result. The generalized pseudo code for fuzzy entropy and genetic algorithm based quantization technique can be used by the processing application 115. The techniques can use different membership functions for evaluating the fuzzy entropy of the image.

The processing application 115 can receive an image and find the thresholds based in part on a genetic algorithm. The processing application 115 can use fuzzy entropy as a cost function. The processing application 115 can also output quantized images along with an SSIM score for each of the quantized images. The processing application 115 can compare the SSIM obtained from each technique to determine a best SSIM 142.

The code in FIG. 6 can be packaged inside a container image 124 and executed as a container 118 in such a way that it can receive an image, find the thresholds based on a genetic algorithm. The genetic algorithm can use fuzzy entropy as cost function. The container 118 can return a quantized image along with its SSIM. The processing application 115 can compare the SSIM obtained from each technique to determine a best image for binarization.

Figure 7A:
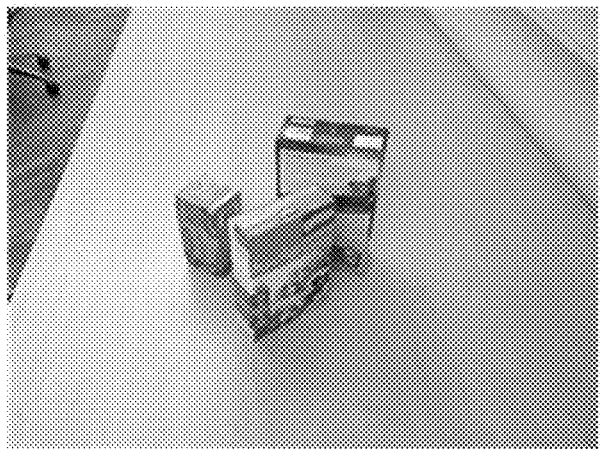
FIGS. 7A-E and 8A-E are examples of images during the process of quantizing the image according to various embodiments of the present disclosure.
Figure 7B:
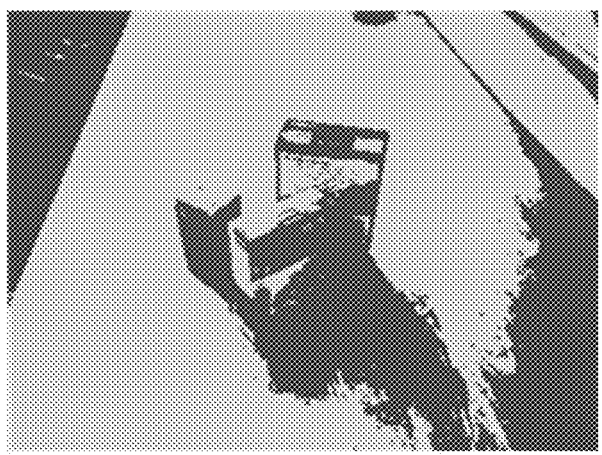
Figure 7C:
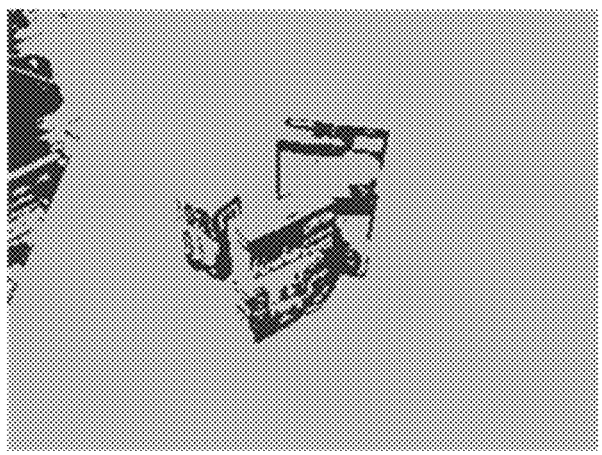
Figure 7D:
Figure 7E:
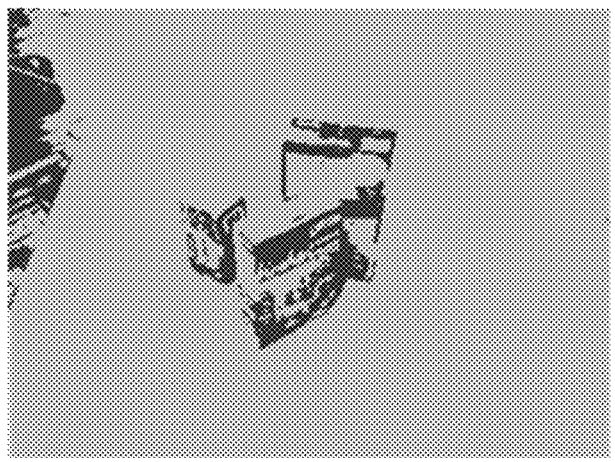
Figure 8A:
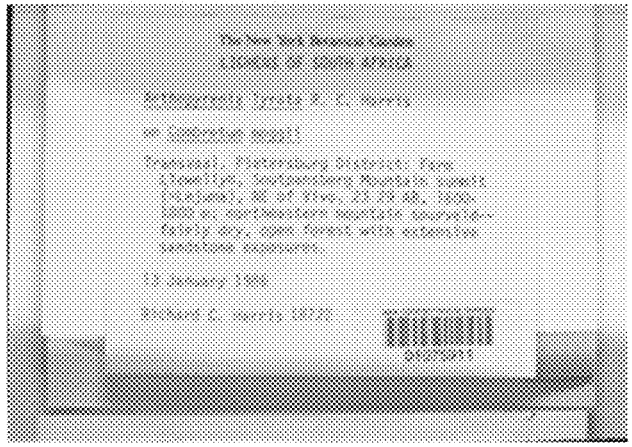

Turning to FIGS. 7A-E and FIGS. 8A-E, shown are example images according to various embodiments. FIGS. 7A-E and FIGS. 8A-E demonstrate processing an image to generate processed images using differing membership functions. The resulting images can be scored to determine a most effective processed image. For example, the images can be scored using SSIM. The images in FIGS. 7A-7E demonstrate determining a most effective processed image to use for detecting objects within the image of FIG. 7A. The images in FIGS. 8A-E demonstrate determining a most effective processed image to use for recognizing text within the image of 8A. The images in FIGS. 7A and 8A are example images received by the processing application 115 for processing.

Figure 8B:
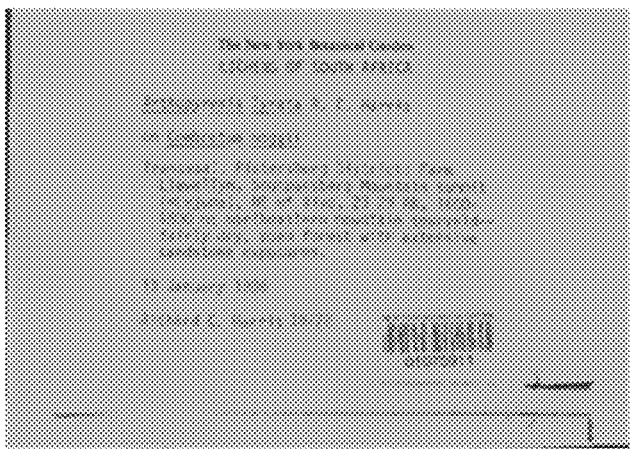
Figure 8C:
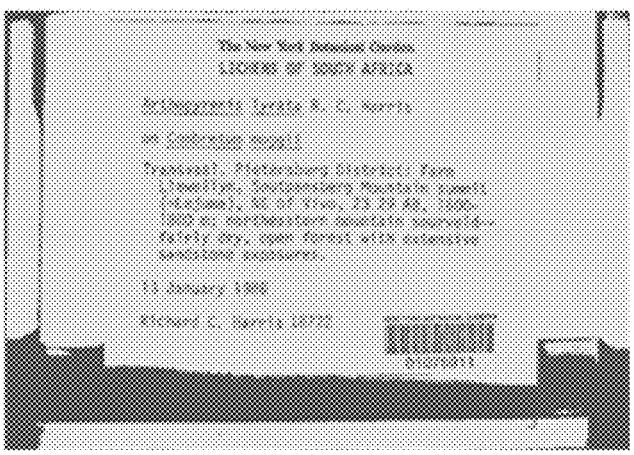
Figure 8D:
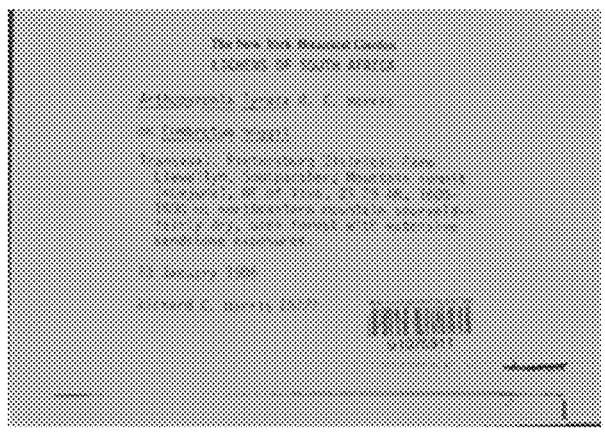
Figure 8E:
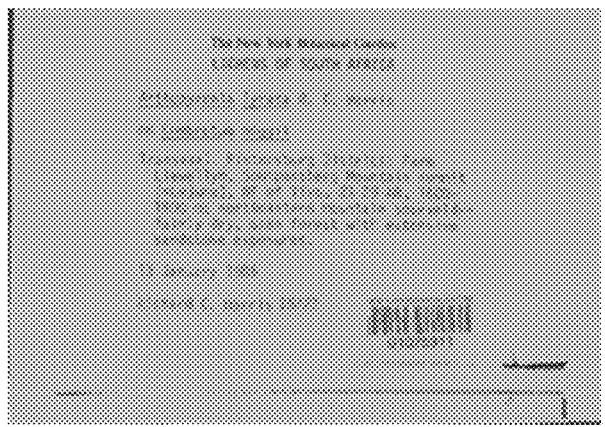

The images can be quantized and binarized to generate the processed images. The quantization can be performed by the processing application 115 using differing membership functions. FIGS. 7B and 8B illustrate images 7A and 8A after being quantized and binarized using the triangular membership function of FIG. 5. Next, FIGS. 7C and 8C illustrate images 7A and 8A after being quantized and binarized using the triangular membership function of FIG. 2. In addition, FIGS. 7D and 8D illustrate images 7A and 8A after being quantized and binarized using the trapizoidal membership function of FIG. 3. Lastly, FIGS. 7E and 8E illustrate images 7A and 8A after being quantized and binarized using the bell shaped membership function shown in FIG. 4.

The processing application 115 can use a genetic algorithm to find an optimal set of membership function parameters P. The genetic algorithm can be used to determine a best set of elements 136 for which the fitness/cost function is maximum. As total fuzzy entropy H can depend on the set of membership functions which are determined by set of parameters P, total fuzzy entropy can be considered as fitness/cost function and parameters P can be considered chromosomes for genetic algorithm. For n level thresholding, the number of chromosomes can be 3*n.

The processing application 115 can receive an image 121 and a number of segments as inputs. The processing application 115 can generate a first set of parameters P randomly. The processing application 115 can calculate total fuzzy entropy H of the image based on the parameters P. The obtained total fuzzy entropy H can be stored as best entropy 133 and parameters are stored as best elements 136.

In a subsequent iteration, the processing application 115 can generate another set of parameters P and calculate a total fuzzy entropy based on the set of parameters. If total fuzzy entropy obtained is greater than the best entropy 133 then H and P are stored in best entropy 133 and best elements 136, respectively. Otherwise, another iteration is performed until a number of iterations is complete.

In one embodiment, 200 iterations can be used. The processing application 115 can use the final set of best elements 136 to find threshold values. The processing application 115 can segment the image by applying the thresholding algorithm with the calculated thresholds. In one embodiment, a segmented image may show that the objects in an input image (foreground) can be easily distinguished from background, which may be an important step in classification or recognition problems, while in another segmented images, the objects in the input image may be difficult to distinguish from the background.

Figure 9:
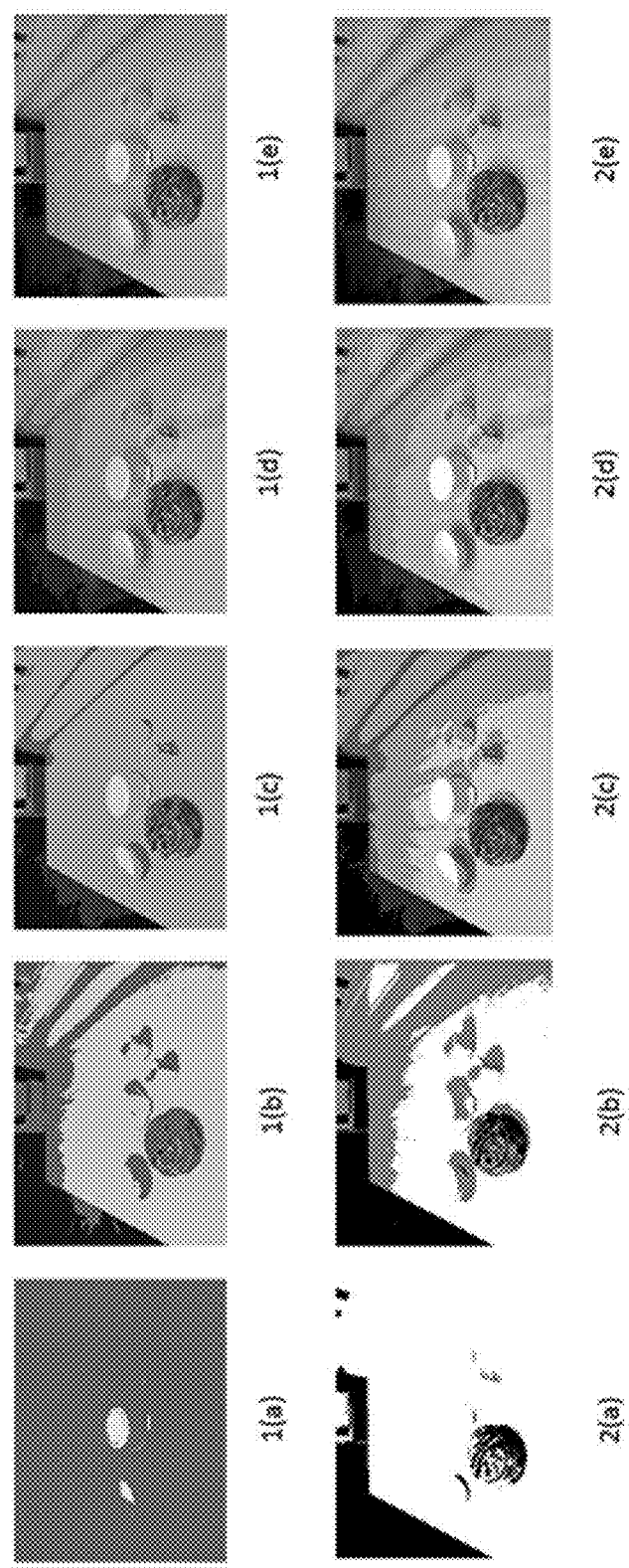
FIG. 9 illustrates a comparison between different thresholding methods according to various embodiments of the present disclosure.

With reference to FIG. 9, shown is a comparison between (1) the thresholding discussed in the quantization process 1400 and (2) an OTSU thresholding process. The (a) through (e) represents threshold levels at 1, 2, 5, 10, and 20, respectively. In FIGS. 9, 1(a) and 2(a) show that when one level threshold is applied to first image in 1(a), the objects in the images are brought out more in comparison to 2(a). From 1(c) and 2(c), five level thresholding has been applied using both the algorithms, it can be observed that foreground (objects) and background can be easily distinguished in 1(c).

Figure 10:
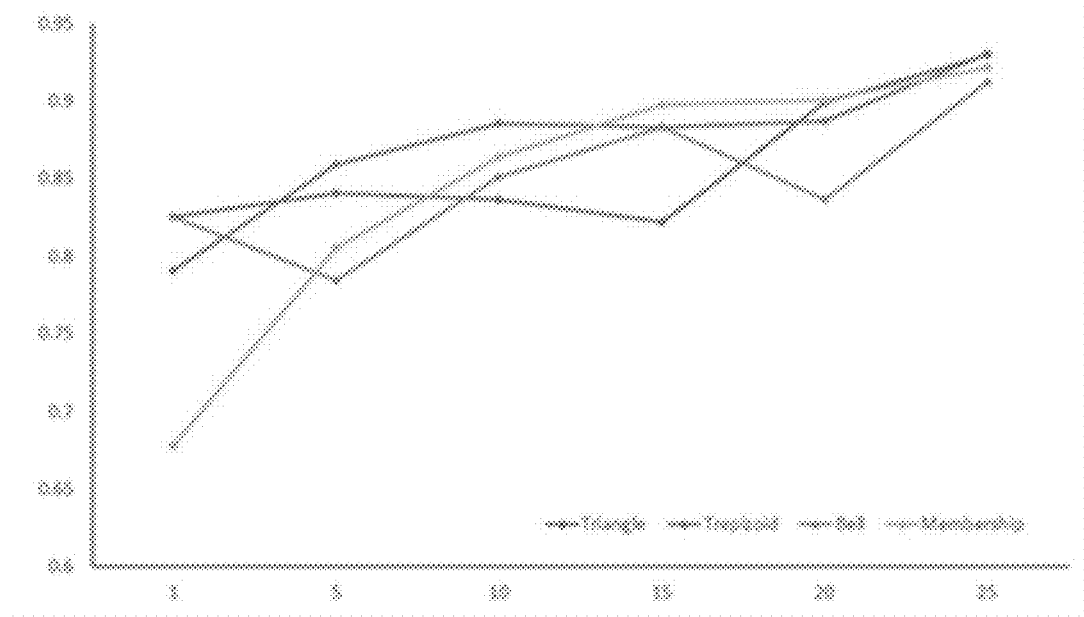
FIG. 10 is a graph comparing scores from different sets of membership functions according to various embodiments of the present disclosure.

With reference to FIG. 10, shown is a graph comparing the SSIM values at different shaped sets of membership functions on a sample image at various thresholding levels.

Figure 11:
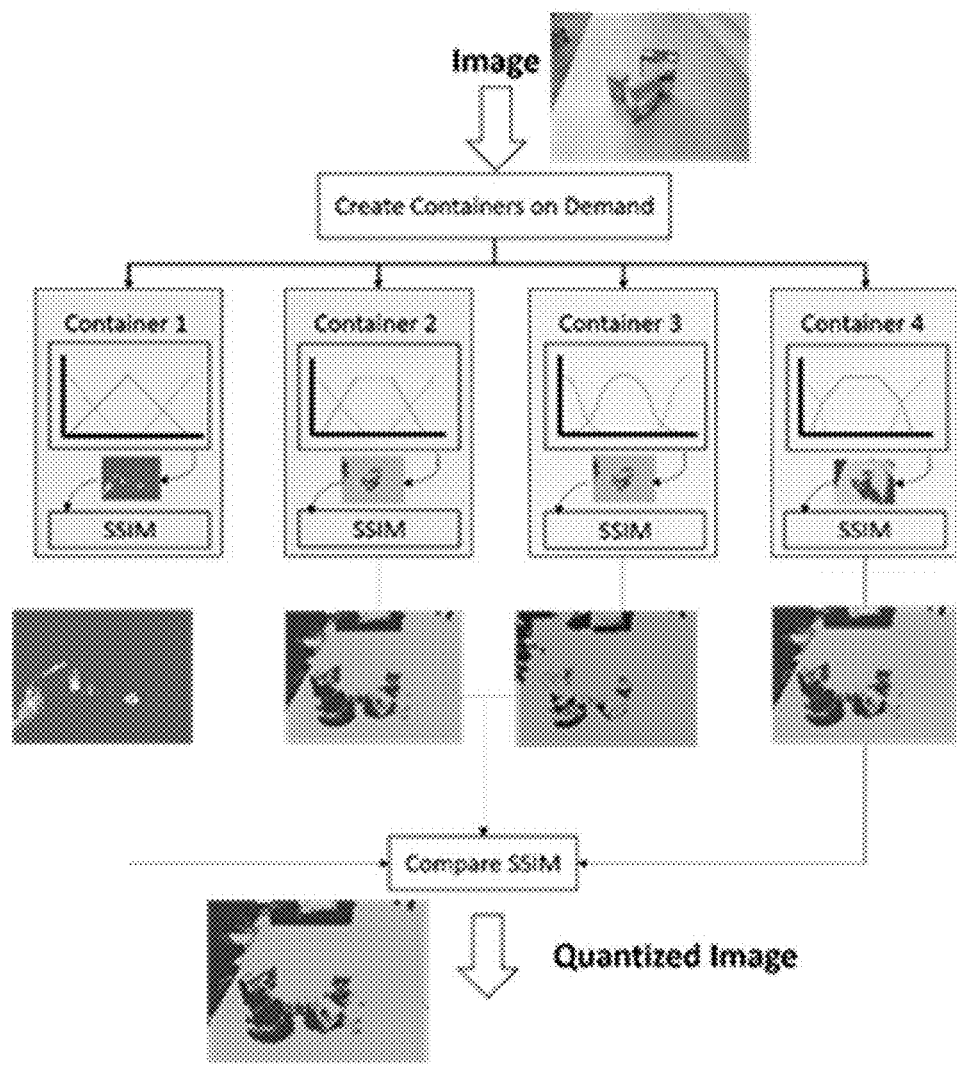
FIG. 11 illustrates an example architecture for container based parallel image quantization according to various embodiments of the present disclosure.

Turning to FIG. 11, shown is an example architecture for container based parallel image quantization. In the example architecture, the processing application 115 can utilize four different types of quantization methods and compare those quantized images to find a best quantized image. Each of the four quantization methods are shown performed in different containers 118.

Figure 12A:
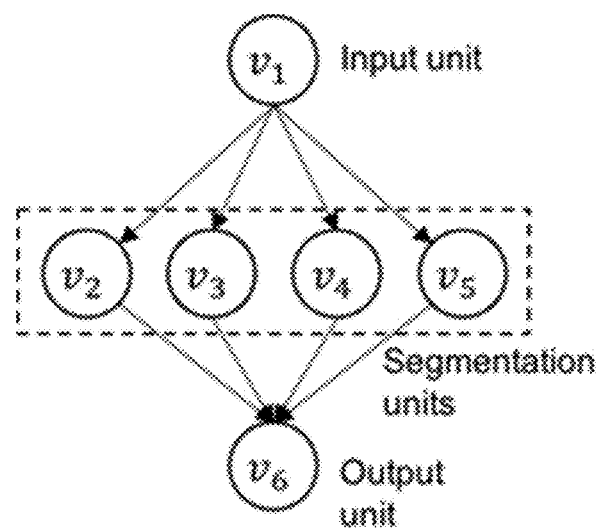
FIG. 12A illustrates a compotation graph for segmentation of processing according to various embodiments of the present disclosure.

With reference to FIG. 12A, shown is a compotation graph for segmentation of processing.

If G is a graph, then G can be represented as:

$$G=(V,E)$$

Where V is set of vertices:

$$\{V=v_1,v_2,v_3,v_4, \ldots v_n\}$$

and E is set of pairwise relationships between the vertices:

$$E=\{(v_1,v_2),(v_1,v_3),(v_3,v_6), \ldots \}$$

Once we have a graph model of a computation, graph partitioning can be used to determine how to divide the work and data for an efficient parallel computation.

In FIG. 12A, $v_1$ and $v_6$ are input and output nodes/units respectively and the rest of the nodes/units are the actual segmentation units. Output node/unit aggregates all the results and decides the best segmented image among all. The processing application 115 can use computation graphs similar to the containers 118. The computation graphs can function as computation units.

Figure 12B:
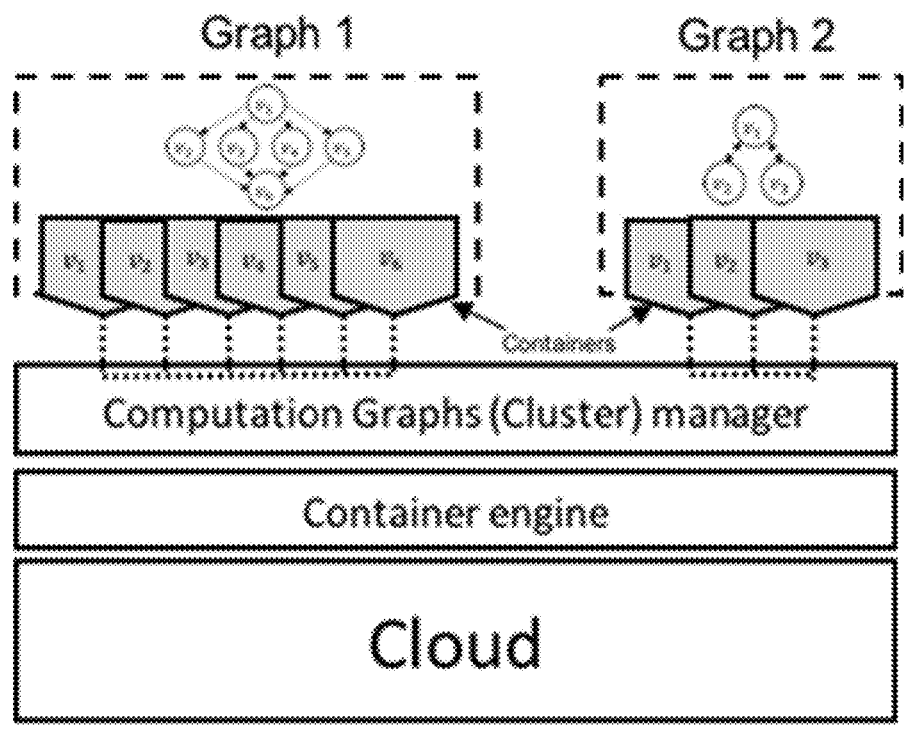
FIG. 12B illustrates a container architecture combined with a computation graph according to various embodiments of the present disclosure.

With reference to FIG. 12B, shown is a container architecture combined with a computation graph. The containers 118 can share a single operating system in a computing environment 103 to run as isolated environments and therefore are able to use the same binaries and libraries, such as container images 124. The containers 118 can enable usage of modular application designs, where the data store 112 is independent and lets you scale applications without also scaling your machines. Each vertex from FIG. 12A can be run as a container 118.

A pool of containers 118 running on single or multiple hosts which communicate between each other can be referred to as a cluster. The computation graph in FIG. 12A can be a cluster. Each container in the cluster can be running a vertex from the computation graph. The processing application can include a cluster or computation graph manager, which is a layer that does all the plumbing work for a cluster. Plumbing work refers to creating a virtual network, spinning a container, and other administrative container tasks.

The processing application 115 can include a lightweight runtime and robust tooling that builds and runs containers 118. The processing application 115 can act as a mediator between the infrastructure (Cloud/computing environment 103) and the containers 118.

Figure 13:
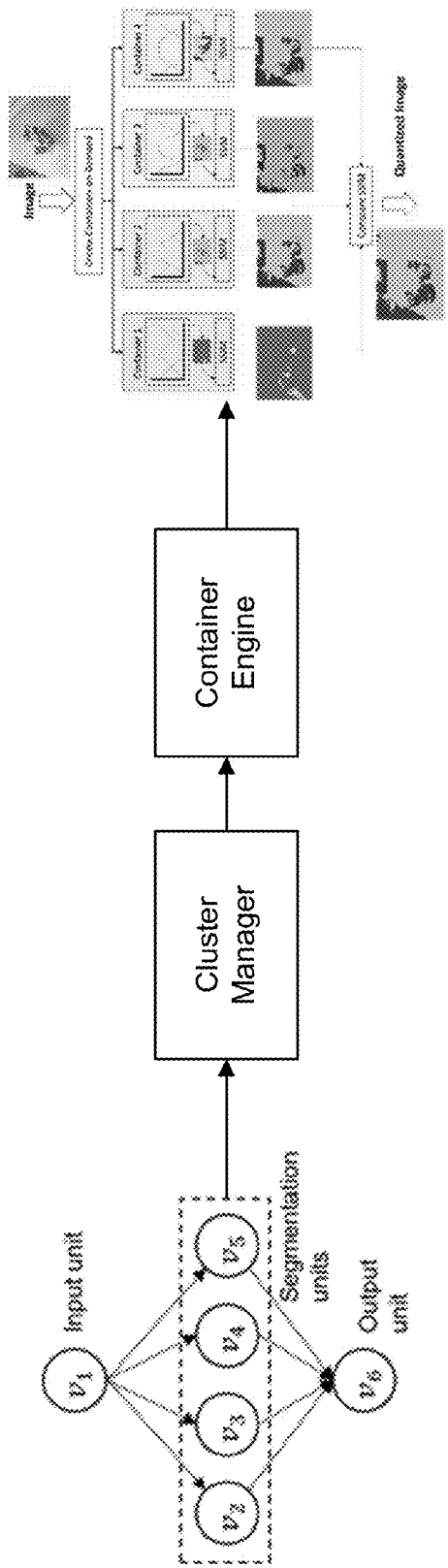
FIG. 13 illustrates a process flow using container based parallel image quantization.

With reference to FIG. 13, shown is a process flow using containers 118 based parallel image quantization. The processing application 115 can communicate with the infrastructure and the containers 118, building and running a container 118. To build a container 118, a user can provide information such as operating system, the libraries to install, file locations to mount and the software, or program to run. The processing application can also create the network for the cluster and add all the containers 118 to the network.

The processing application 115 can read a configuration file or obtain a configuration in another way, such as from the user. The configuration can include the graph information and instructions for the processing application 115 to build a cluster. The configuration can include have information on how the containers 118 should be built, network topology, and configuration information of communication links (Edges) between different containers 118.

Implementing the computational model using the networked environment 100 can be referred to as a 5-step process. The computation model can be converted into a graph. The graph can be input into the processing application 115 in a prescriptive way (like YAML file). The processing application 115 can build all the vertices as containers 118 and builds the system using the containers 118 based on the graph.

The computation model can be divided into 6 different vertices, similar to the vertices shown in FIG. 11. Each algorithm can have its own node and rest of the nodes are input and result aggregator. The input vertex (container 118) receives the image and sends it to the vertices 1, 2, 3 and 4. Inside each vertex specific quantization, code can be running. Once the SSIM for the image is calculated, the container 118 can output the image and SSIM to the processing application 115. The processing application 115 can use another comparison vertex to collect the SSIM values and quantized images from the four containers 118 once the containers 118 have finished processing the data. The image that has the best SSIM value can be used for binarization or for another use.

Figure 14:
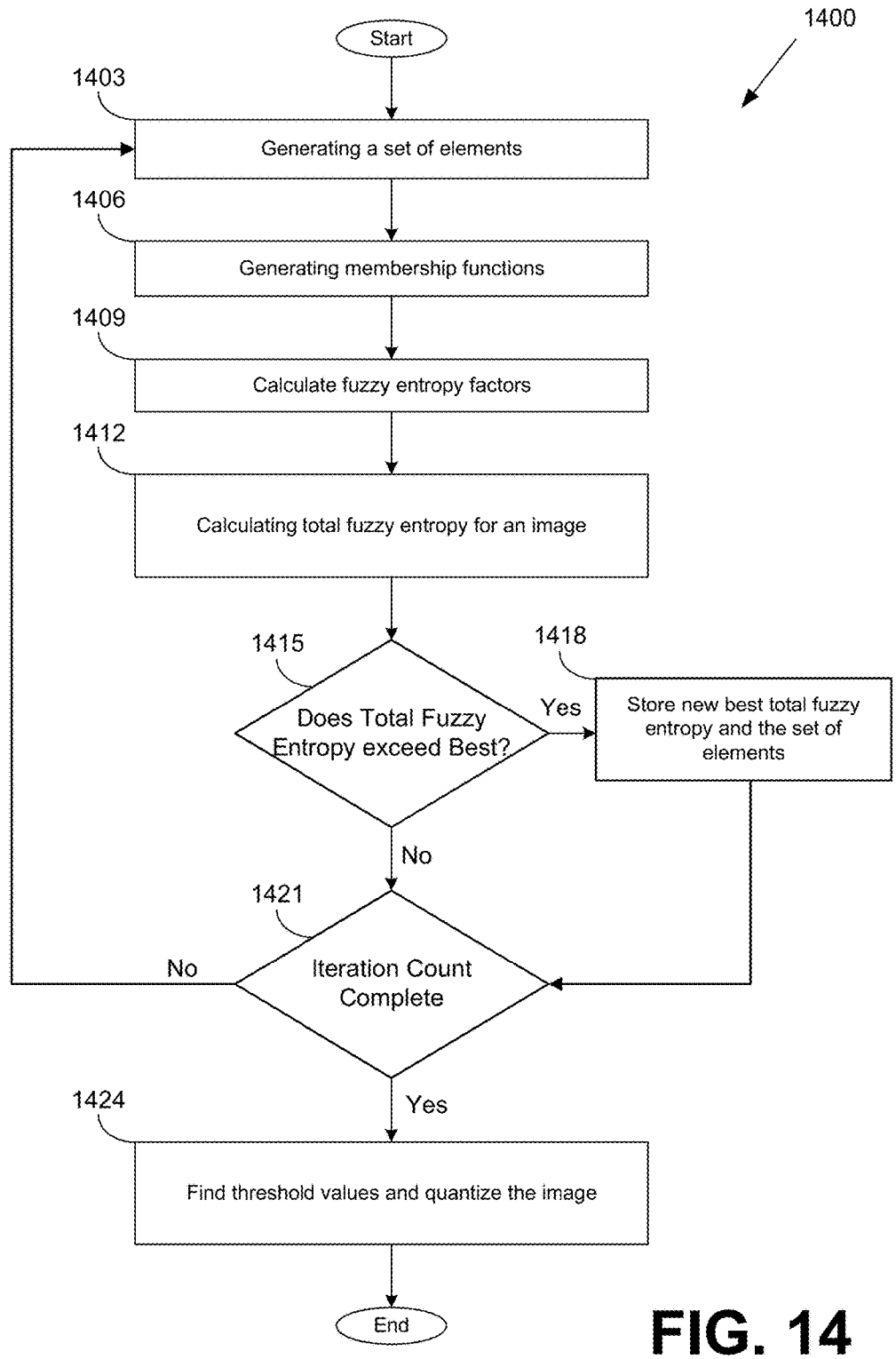
FIG. 14 is a flowchart illustrating one example of functionality implemented as portions of processing application executed in a computing environment in the networked environment of FIG. 1 according to various embodiments of the present disclosure.

With regard to FIG. 14, shown is a quantization process 1400 that provides one example of the operation of a portion of a processing application 115 executed in the networked environment 100 (FIG. 1) according to various embodiments. It is understood that the flowchart of FIG. 14 provides merely an example of the many different types of functional arrangements that can be employed to implement the operation of the portion of the processing application 115 as described herein. As an alternative, the quantization process 1400 of FIG. 14 can be viewed as depicting an example of elements of a method implemented in the computing environment 103 according to one or more embodiments.

At box 1403, the quantization process 1400 can generate a set of elements. For example the processing application 115 can generate elements for a current iteration. The elements can be used in a genetic algorithm with the various parameters. The processing application 115 can randomly choose a set of elements (Pop). The number of elements can be predefined. The value of each of the number of elements can be randomly selected.

In one embodiments, the processing application 115 randomly selects a respective value for each of the elements from between 0 and 255. The processing application 115 can sort the elements in ascending order. In some embodiments, the processing application 115 selects the elements from within a range according to constraints. As an example, the processing application 115 random values for the elements can be selected based on a shape corresponding to the membership functions. The set of elements can be expressed as P:

$$P=\{0,a_1,a_2, \ldots a_n,255\}$$

$$0<a_1,a_2, \ldots a_n<255$$

where $a_1, a_2, \ldots a_n$ are the individual elements.

At box 1406, the quantization process includes generating membership functions. As an example, the processing application 115 can generate membership functions using the elements from 1403. The membership functions can be of different shapes, for example, triangular, trapezoidal, bell, and other shapes. Each membership function can have its own mathematical representation with a set of variables (Pop).

The processing application 115 can generate the membership functions using the elements generated in box 1403 as the set of variables. As an example, the processing application 115 can insert the elements as constants from box 1403 into predefined formulas to generate the membership functions. A different number of variables can be used to determine each membership function. According to one embodiment, a triangular membership function uses two variables to generate four different membership functions. In another embodiment, a trapezoidal membership function uses four variables to generate three different membership functions.

According to one embodiment, the membership functions can be $\mu_d = Z_d(k, a_1, a_2, a_3)$, where $\mu_d$ is a membership function, $\mu_0$ through $\mu_n$ are the set of membership functions, $a_1, a_2, a_3$ are the elements generated in box 1403, and k=0, 1, 2 ... n−1. In one embodiment, the set of membership functions can be expressed as:

$$\mu_0(k) = \begin{cases} 0 & 0 \geq k \\ \dfrac{a_1 - k}{a_1} & 0 < k \leq a_1 \\ 0 & k < a_1 \end{cases}$$

$$\mu_q(k) = \begin{cases} 0 & k \leq a_q \\ \dfrac{k - a_q}{(a_{q+1} - a_q)} & a_q \leq k \leq a_{q+1} \\ \dfrac{\alpha_{q+2}}{(a_{q+2} - a_{q+1})} & a_{q+1} \leq k \leq a_{q+2} \\ 0 & k > a_{q+2} \end{cases}$$

$$\mu_{n-1}(k) = \begin{cases} 0 & k \leq a_{n-1} \\ \dfrac{k - a_{n-1}}{255 - a_{n-1}} & a_{n-1} < k \leq 255 \\ 0 & k > 255 \end{cases}$$

At box 1409, the quantization process 1400 includes calculating fuzzy entropy factors. For example, the processing application 115 can calculate the fuzzy entropy for each of the membership functions. The probability distribution is given by $P_d = \Sigma_{k=0}^{255} P_k * \mu_d(k)$, where $\mu_d$ is the membership function of a level in n levels, and $P_k$ is the probability distribution of each level in an image. The fuzzy entropy can be calculated as follows $$H_d = -\sum_{k=0}^{255} \frac{p_k * \mu_d(k)}{p_d} \ln\left(\frac{p_k * \mu_d(k)}{p_d}\right)$$

At box 1412, the quantization process 1400 includes calculating a total fuzzy entropy for an image using the membership functions. For example, the processing application 115 can calculate a total fuzzy entropy for an image. The processing application 115 can sum each of the fuzzy entropy factors from the set of membership functions from box 1409. The total entropy can be calculated as:

$$H = \sum_{d=0}^{n-1} H_d$$

At box 1415, the quantization process 1400 includes determining whether the total fuzzy entropy exceeds the best total fuzzy entropy. For example, the processing application 115 determines whether the total fuzzy entropy exceeds the current best total fuzzy entropy. The processing application 115 or container 118 can compare the total entropy for the image 121 to the best entropy 133. If the total entropy exceeds the best entropy 133, the quantization process 1400 proceeds to box 1418. Otherwise, the quantization process 1400 proceeds to box 1421.

At box 1418, the quantization process 1400 can store the best entropy and the image. For example, the processing application 115 stores the new best total fuzzy entropy as best entropy 133 for the image and the set of elements as best elements 136.

At box 1421, the quantization process 1400 determines whether the current iteration count meets a predefined count. For example, the processing application 115 can determine if an iteration count is complete. If so, the quantization process 1400 proceeds to box 1424. Otherwise, an iteration counter is incremented, and the quantization process 1400 proceeds to box 1403.

At box 1424, the quantization process 1400 determines thresholds and quantizes the image. For example, the processing application 115 determines threshold values to use and quantizes the image using the determined threshold valves. The processing application can calculate threshold values based on the elements corresponding to the best total fuzzy entropy. The threshold values can be defined by the following equation:

$$t_i = \frac{P[i] + P[i+1]}{2}$$

Where P is the set of elements and $t_i$ is the threshold for i when i=0, 1, 2 ... len(P)−1.

The processing application 115 can threshold an image based on genetic algorithm and fuzzy logic. The fuzzy entropy of an image can be used as a cost function for the genetic algorithm. According to one embodiment, the fuzzy entropy depends on membership functions, which can be controlled using a set of parameters. The optimized set of these parameters can be determined by maximizing the fuzzy entropy using genetic algorithm. The thresholds can be calculated using the optimized set of parameters.

Figure 15:
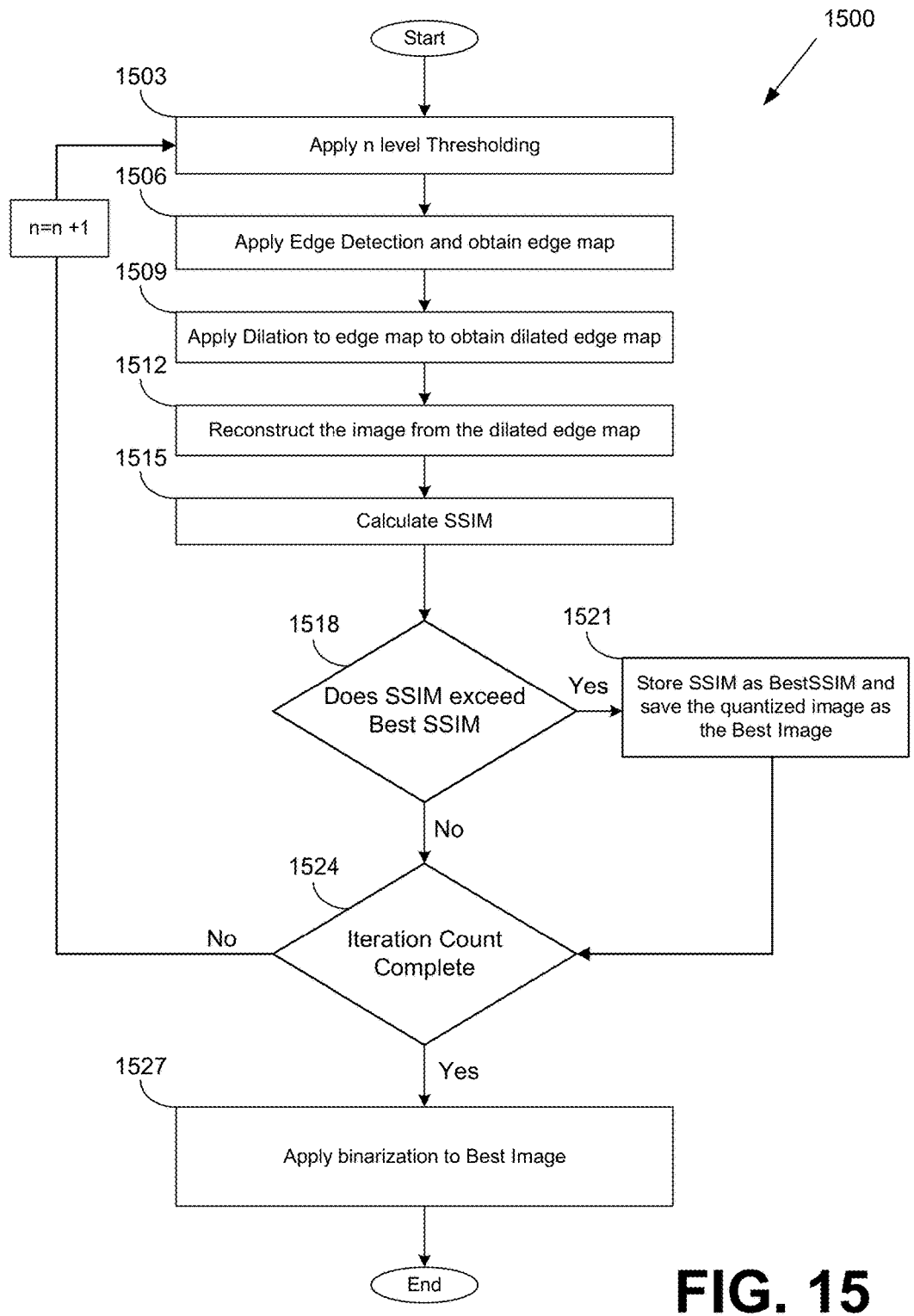
FIG. 15 is a flowchart illustrating one example of functionality implemented as portions of processing application executed in a computing environment in the networked environment of FIG. 1 according to various embodiments of the present disclosure.

With regard to FIG. 15, shown is a flowchart depicting a binarization process 1500 that provides one example of the operation of a portion of a processing application 115 executed in the computing environment 103 (FIG. 1) according to various embodiments. It is understood that the flowchart of FIG. 15 provides merely an example of the many different types of functional arrangements that can be employed to implement the operation of the portion of the processing application 115 as described herein. As an alternative, the flowchart of FIG. 15 can be viewed as depicting an example of elements of a method implemented in the computing environment 103 according to one or more embodiments.

At box 1503, the binarization process 1500 includes thresholding a quantized image. The processing application 115 can iteratively process a quantized image to determine a best processed image for binarization based on scoring each of the processed images. The processing application 115 can identify an quantized image that was quantized at with a specific thresholding level, such as a quantized image from box 1424. The quantization process 1400 can be applied to an image for each thresholding level to generate multiple quantized images.

The processing application 115 can iterate through quantized images at n level thresholding. The value of n can be predefined, configured, or otherwise specified. A counter can iterate from 1 to n during the binarization process 1500.

At box 1506, the binarization process 1500 includes applying an edge detection algorithm to obtain an edge map.

The processing application 115 can generate an edge map by applying an edge detection algorithm to the image.

At box 1509, the binarization process 1500 includes applying a dialation to an edge map to obtain a dialated edge map. The processing application 115 can generate a dialated edge map by dialating the edge map from box 1506.

At box 1512, the binarization process 1500 includes reconstructing the image from the dialated edge map. The processing application 115 can be reconstruct an image using the generated edge map, such as a gray scale edge map. The processing application 115 can subtract the original quantized image from the edge map to reconstruct the image.

At box 1515, the binarization process 1500 includes calculating an SSIM score for the reconstructed image. The processing application 115 can calculate an SSIM score for the reconstructed image.

At box 1518, the binarization process 1500 includes determine whether the SSIM score for the reconstructed image exceeds the best SSIM score. If the SSIM score exceeds the best SSIM score, the binarization process 1500 proceeds to box 1521. Otherwise the binarization process 1500 proceeds to box 1524. According to one embodiment, on the first iteration, the result of the SSIM can be recorded as the best SSIM score and the quantized image is saved as the best image. Otherwise, the processing application 115 can compare the result of the SSIM score to the best SSIM score. If the result is greater than the best SSIM score, the reconstructed image corresponding to the higher score replaces the current best image and the higher score replaces the best SSIM score.

At box 1521, the binarization process 1500 includes storing the SSIM score for the quantized image as the best SSIM and store the quantized image as the best image. For example, the processing application 115 can store the SSIM score for the quantized image as best SSIM 142 and store the quantized image as best image 139.

At box 1524, the binarization process 1500 includes determining whether the iteration is complete. If the iteration counter n is less than a preconfigured count of iterations to complete, the binarization process 1500 proceeds to box 1503 and increments n. Otherwise, the binarization process proceeds to box 1527.

At box 1527, the binarization process 1500 includes applying a binarization algorithm to the best image.

According to another embodiment, after the SSIM scores are compared, the processing application compares a quantization level limit to the counter to determine if another iteration is to be performed. If another iteration is to be performed, the counter is incremented by one, and the process is repeated.

Figure 16:
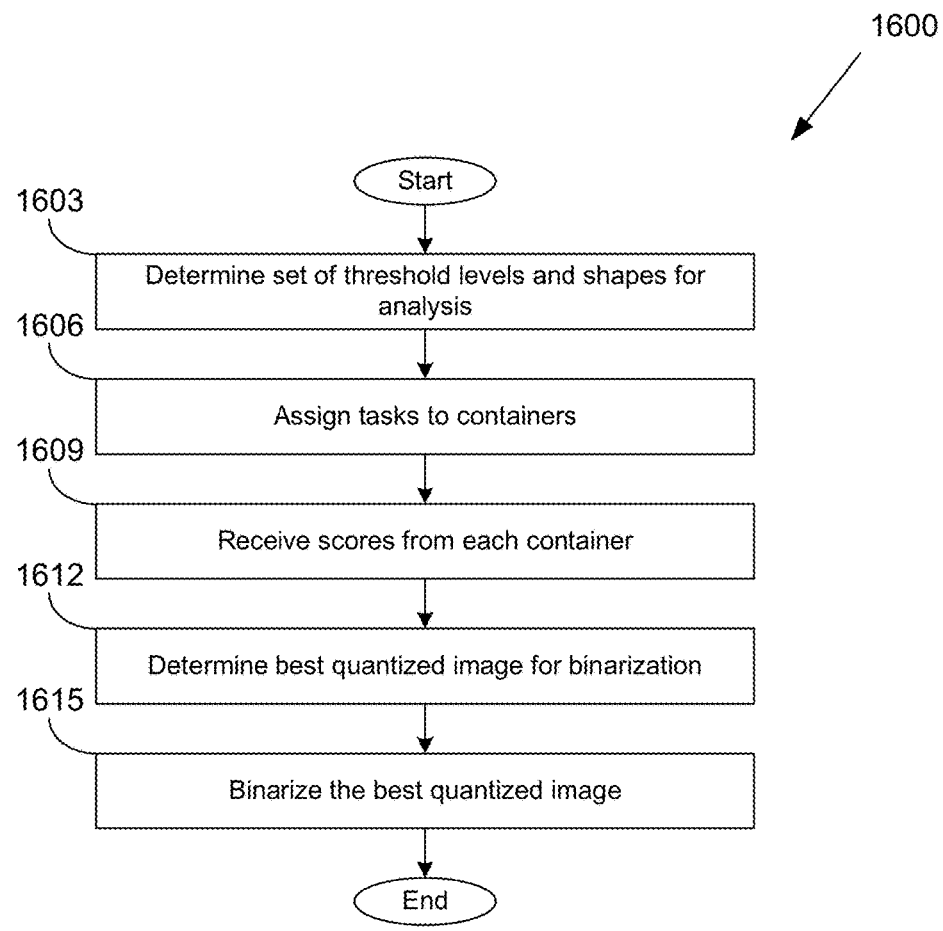
FIG. 16 is a flowchart illustrating one example of functionality implemented as portions of processing application executed in a computing environment in the networked environment of FIG. 1 according to various embodiments of the present disclosure.

With regard to FIG. 16, shown is a flowchart depicting a containerized process 1500 that provides one example of the operation of a portion of a processing application 115 executed in the computing environment 103 (FIG. 1) according to various embodiments. It is understood that the flowchart of FIG. 16 provides merely an example of the many different types of functional arrangements that can be employed to implement the operation of the portion of the processing application 115 as described herein. As an alternative, the flowchart of FIG. 16 can be viewed as depicting an example of elements of a method implemented in the computing environment 103 according to one or more embodiments.

At box 1603, the containerized process 1600 includes determining a set of threshold levels and shapes for analysis. For example, the processing application 115 can determine a set of threshold levels across one or more formulas to use for analysis. The threshold levels and formulas can be preconfigured, such as via a configuration file or be configured based on resources of the system, a number of images to analyze, where a request to analyze the image originated, or based on a subsequent image recognition algorithm to be applied to the resulting image.

At box 1606, the containerized process 1600 includes assigning tasks to containers. The processing application 115 can assign one or more tasks to one or more containers 118. The processing application 115 can spawn or execute a variable number of containers based on system resources and the number of quantized images to generate and score.

In one embodiment, the containers 118 can execute the quantization process 1400 on an image provided by the processing application 115 with parameters received from the processing application 115. The parameters can include a formula for a set of membership functions, constraints on parameters, and/or a thresholding level. The containers 118 can calculate an SSIM score for the quantized image using the steps of boxes 1503, 1506, 1509, 1512, and 1515. The containers 118 can return the resulting SSIM score to the processing application 115.

At box 1609, the containerized process 1600 includes receiving scores from each of the containers. For example, the processing application 115 can receive SSIM scores from each of the containers 118. The processing application 115 can store the scores in the processing data 130 for further processing.

At box 1612, the containerized process 1600 includes determining the best quantized image for binarization. The processing application 115 can sort the SSIM scores received from the containers 118. The processing application 115 can select a highest score from the received SSIM scores. In one embodiment, the processing application 115 iterates through the scores performing the step in box 1518.

At box 1615, the containerized process 1600 includes binarizing the best quantized image. As an example, the processing application 115 can binarize the quantized image that corresponds to the highest score. In one embodiment, the processing application 115 performs the step in box 1527.

Figure 17:
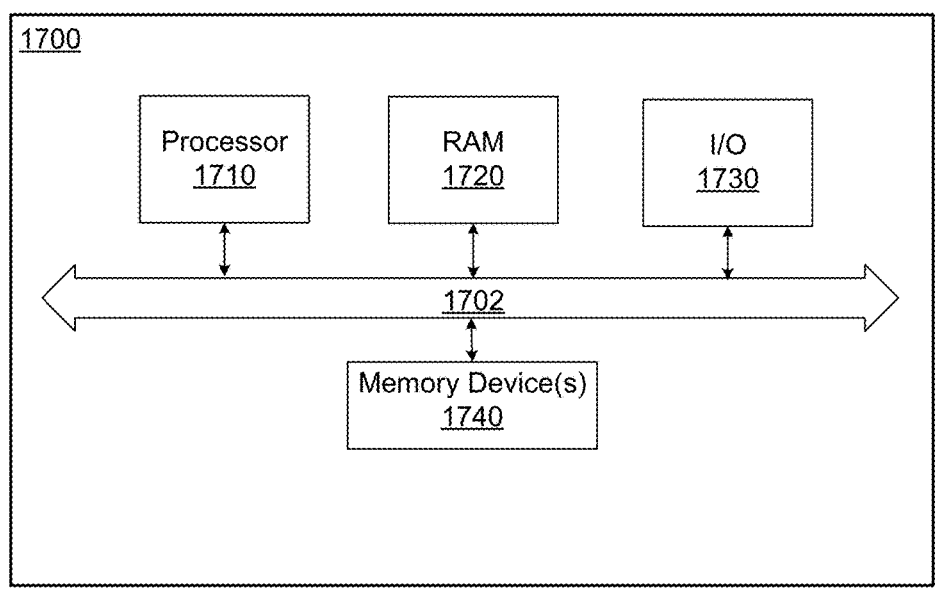
FIG. 17 is a schematic block diagram that provides one example illustration of a computing environment employed in the networked environment of FIG. 1 according to various embodiments of the present disclosure.

With reference to FIG. 17, shown is a schematic block diagram of the computing environment 103 according to an embodiment of the present disclosure. The computing environment 103 includes one or more computing devices 1700 Each computing device 1700 includes at least one processor circuit, for example, having a processor 1710 and a memory 1720 and/or 1740, both of which are coupled to a local interface 1702. To this end, each computing device 1700 may comprise, for example, at least one server computer or like device. The local interface 1702 may comprise, for example, a data bus with an accompanying address/control bus or other bus structure as can be appreciated.

Stored in the memory 1720/1740 are both data and several components that are executable by the processor 1710. In particular, stored in the memory 1720/1740 and executable by the processor 1710 are the processing application 115, the containers 118, and the client application 145, and potentially other applications. Also stored in the memory 1720/1740 may be a data store 112 and other data. In addition, an operating system may be stored in the memory 1720/1740 and executable by the processor 1710.

It is understood that there may be other applications that are stored in the memory 1740 and are executable by the processor 1710 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1740 and are executable by the processor 1710. In this respect, the term "executable" means a program file that is in a form that can ultimately be run by the processor 1710. Examples of executable programs may be, for example, a compiled program that can be translated into machine code in a format that can be loaded into a random access portion of the memory 1740 and run by the processor 1710, source code that may be expressed in proper format such as object code that is capable of being loaded into a random access portion of the memory 1740 and executed by the processor 1710, or source code that may be interpreted by another executable program to generate instructions in a random access portion of the memory 1740 to be executed by the processor 1710, etc. An executable program may be stored in any portion or component of the memory 1740 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1740 is defined herein as including both volatile and nonvolatile memory and data storage components. Volatile components are those that do not retain data values upon loss of power. Nonvolatile components are those that retain data upon a loss of power. Thus, the memory 1740 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1710 may represent multiple processors 1710 and/or multiple processor cores and the memory 1740 may represent multiple memories 1740 that operate in parallel processing circuits, respectively. In such a case, the local interface 1702 may be an appropriate network that facilitates communication between any two of the multiple processors 1710, between any processor 1710 and any of the memories 1740, or between any two of the memories 1740, etc. The local interface 1702 may comprise additional systems designed to coordinate this communication, including, for example, performing load balancing. The processor 1710 may be of electrical or of some other available construction.

Although the processing application 115, the containers 118, and the client application 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 14-16 show the functionality and operation of an implementation of portions of the processing application 115, the containers 118, and the client application 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1710 in a computer system or other system. The machine code may be converted from the source code, etc. If embodied in hardware, each block may represent a circuit or a number of interconnected circuits to implement the specified logical function(s).

Although the flowcharts of FIGS. 14-16 show a specific order of execution, it is understood that the order of execution may differ from that which is depicted. For example, the order of execution of two or more blocks may be scrambled relative to the order shown. Also, two or more blocks shown in succession in FIGS. 14-16 may be executed concurrently or with partial concurrence. Further, in some embodiments, one or more of the blocks shown in FIGS. 14-16 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the processing application 115, the containers 118, and the client application 145, that comprises software or code can be embodied in any non-transitory computer-readable medium for use by or in connection with an instruction execution system such as, for example, a processor 1710 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the processing application 115, the containers 118, and the client application 145, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1700 or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, what is claimed:

1. A non-transitory computer-readable medium embodying a program, that when executed in at least one computing device, causes the at least one computing device to at least:
    generate a plurality of sets of membership functions based at least in part on a plurality of sets of elements;
    generate a plurality of quantized images from an image based at least in part on an entropy score of each of the plurality of sets of membership functions; and
    generate a binarized image based at least in part on one of the plurality of the plurality of quantized images.

2. The non-transitory computer-readable medium of claim 1, wherein the program further causes the at least one computing device to at least:
    generate a second plurality of sets of membership functions based at least in part on a second plurality of sets of elements, wherein the plurality of sets of membership functions correspond to a first formula and the second plurality of sets of membership functions correspond to a second formula; and
    generating another quantized image from the image based at least in part on one of the second plurality of sets of membership functions.

3. The non-transitory computer-readable medium of claim 2, wherein at least one of the plurality of quantized images is generated in a first container and the other quantized image is generated in a second container, the first container and the second container are executed in parallel.

4. The non-transitory computer-readable medium of claim 1, wherein the program further causes the at least one computing device to at least:
    generate an edge map by applying an edge detection on at least one of the plurality of quantized images;
    generate a dialated edge map by applying a dialation to the edge map; and
    generate a reconstructed image based at least in part on the dialated edge map and the at least one of the plurality of quantized images.

5. The non-transitory computer-readable medium of claim 1, wherein the program further causes the at least one computing device to at least determine a plurality of total entropies individually corresponding to each of the plurality of sets of membership functions, wherein the one of the plurality of sets of membership functions corresponds to a best total entropy of the plurality of total entropies.

6. The non-transitory computer-readable medium of claim 1, wherein at least one of the plurality of quantized images is generated by reducing a number of grey scales or colors available to represent each pixel of the image using a lossy compression algorithm.

7. The non-transitory computer-readable medium of claim 1, wherein the entropy score is generated by summing an entropy of each membership function.

8. A system comprising:
    a data store; and
    at least one computing device in communication with the data store, the at least one computing device being configured to at least:
        generate a plurality of sets of membership functions based at least in part on a plurality of sets of elements;
        generate a plurality of quantized images from an image based at least in part on an entropy score of each of the plurality of sets of membership functions; and
        generate a binarized image based at least in part on the one of the plurality of quantized images.

9. The system of claim 8, wherein the at least one computing device is further configured to at least:
    generate a second plurality of sets of membership functions based at least in part on a second plurality of sets of elements, wherein the plurality of sets of membership functions correspond to a first formula and the second plurality of sets of membership functions correspond to a second formula; and
    generate a another quantized image from the image based at least in part on one of the second plurality of sets of membership functions.

10. The system of claim 8, wherein the at least one computing device is further configured to at least:
    calculate a first score based at least in part on at least one of the plurality of quantized images;
    calculate a second score based at least in part on another one of the plurality of quantized images; and
    select the one of the plurality of quantized images to generate the binarized image based at least in part on the first score exceeding the second score.

11. The system of claim 8, wherein a first quantized image the plurality of quantized images is generated in a first container and the second a second quantized image of the plurality of quantized images is generated in a second container, wherein the first container and the second container are executed in parallel.

12. The system of claim 8, wherein the at least one computing device is further configured to at least:

generate an edge map by applying an edge detection on a quantized image of the plurality of quantized images;
generate a dialated edge map by applying a dialation to the edge map;
generate a reconstructed image based at least in part on the dialated edge map and the quantized image; and
calculate a score based at least in part on the reconstructed image.

13. The system of claim 8, wherein the entropy score is generated by summing an entropy of each membership function.

14. A method comprising:
generating, via at least one computing device, a plurality of sets of membership functions based at least in part on a plurality of sets of elements;
generating, via the at least one computing device, a plurality of quantized images from an image based at least in part on an entropy score of each of the plurality of sets of membership functions; and
generating, via the at least one computing device, a binarized image based at least in part on one of the plurality of quantized images.

15. The method of claim 14, wherein each of the plurality of quantized images are generated in a respective container of a plurality of containers.

16. The method of claim 14, further comprising:
generating, via the at least one computing device, a plurality of edge maps by applying an edge detection on the plurality of quantized images;
generating, via the at least one computing device, a plurality of dialated edge maps by applying a dialation to the edge map on the plurality of edge maps;
generating, via the at least one computing device, a plurality of reconstructed images based at least in part on the plurality of dialated edge map and the plurality of quantized images; and
calculating, via the at least one computing device, a plurality of scores based at least in part on the plurality of reconstructed images.

17. The method of claim 16, further comprising identifying, via the at least one computing device, a best score of the plurality of scores, wherein the binarized image is generated based at least in part on the one of the plurality of quantized images that corresponds to the best score.

18. The method of claim 14, wherein the entropy score is determined by summing a respective entropy of each membership function of a corresponding set of membership functions.

19. The method of claim 14, a first quantized image of the plurality of quantized images is generated in a first computational graph and a second quantized image of the plurality of quantized images is generated in a second computational graph.

20. The system of claim 8, further comprising a means for displaying, wherein the at least one computing device is further configured to at least render a user interface on the means for displaying, the user interface comprising the image.

* * * * *